United States Patent [19]

Kitajima et al.

[11] Patent Number: 5,460,503
[45] Date of Patent: Oct. 24, 1995

[54] MOLD FOR FORMING A CORELESS ARMATURE

[75] Inventors: Goro Kitajima; Naohiro Hanaoka, both of Hachioji; Mitsuo Nasu, Tachikawa, all of Japan

[73] Assignee: Olympus Optical Company, Limited, Japan

[21] Appl. No.: 183,952

[22] Filed: Jan. 19, 1994

Related U.S. Application Data

[62] Division of Ser. No. 908,774, Jul. 1, 1992, Pat. No. 5,304,884, which is a continuation of Ser. No. 257,470, Oct. 13, 1988, abandoned.

[30] Foreign Application Priority Data

Jan. 19, 1988 [JP] Japan ....................... 63-9244

[51] Int. Cl.6 ................................... B29C 45/14
[52] U.S. Cl. ..................... 425/116; 425/117; 425/125; 425/544; 425/DIG. 47; 264/272.2; 249/93; 249/95; 249/96
[58] Field of Search ................... 425/577, 117, 425/125, 441, 116, 544, DIG. 47, DIG. 228, 123; 249/83, 96, 152, 91, 93, 95; 264/272.11, 272.19, 272.2

[56] References Cited

U.S. PATENT DOCUMENTS

| | | | |
|---|---|---|---|
| 3,737,988 | 6/1973 | Bednarski | 29/596 |
| 4,250,128 | 2/1981 | Meckling | 425/3 |
| 4,337,568 | 7/1982 | Morisawa | 29/598 |
| 4,573,631 | 9/1986 | Io et al. | 264/272.2 |
| 4,583,933 | 4/1986 | Woeffel et al. | 425/441 |
| 4,663,835 | 5/1987 | Callier, Sr. | 29/598 |
| 4,696,631 | 9/1987 | Mitt | 264/272.2 |
| 4,832,307 | 5/1989 | Watanabe et al. | 249/152 |
| 4,833,769 | 5/1989 | Tomite et al. | 29/597 |
| 4,840,557 | 6/1989 | Ishimoto et al. | 425/577 |
| 4,868,970 | 9/1989 | Schultz et al. | 264/272.2 |
| 4,983,866 | 1/1991 | Lok | 249/97 |

FOREIGN PATENT DOCUMENTS 55-125061  9/1980  Japan.

*Primary Examiner*—Khanh P. Nguyen

[57] ABSTRACT

A mold for forming coreless armatures having an upper mold and a lower mold. The lower mold has a mold cavity for receiving a shaft capable of supporting windings of a coreless armature. An elastic ring plate is placed between the upper and lower molds and is adapted for being compressed therebetween. The elastic ring plate is further adapted to contact terminal ends of the windings as they extend outside of the mold cavity, and to seal said mold cavity with the terminal ends extending therefrom.

11 Claims, 10 Drawing Sheets

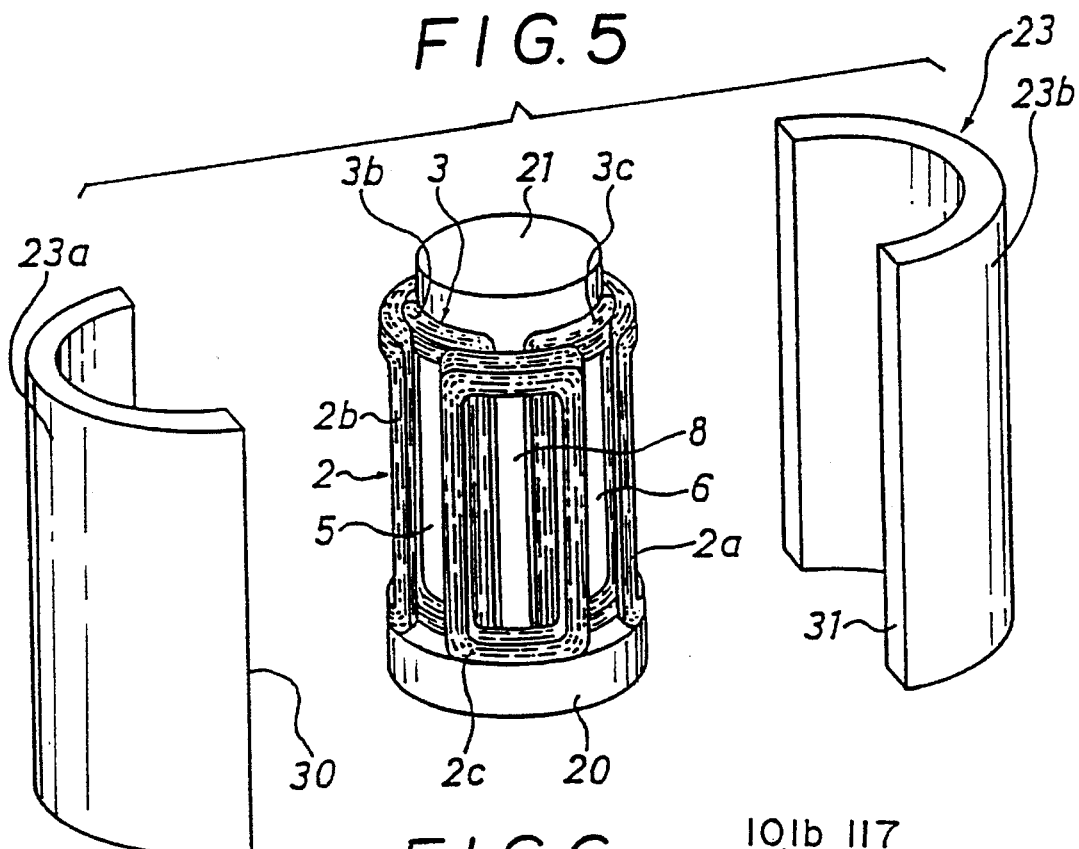
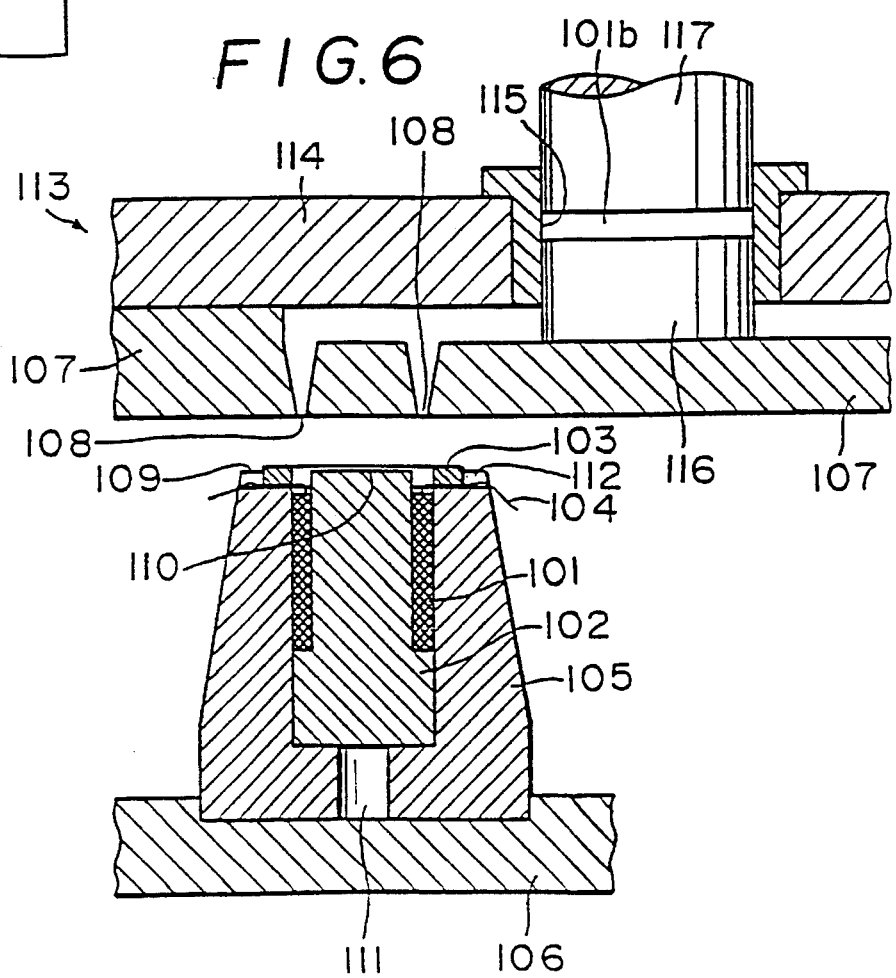

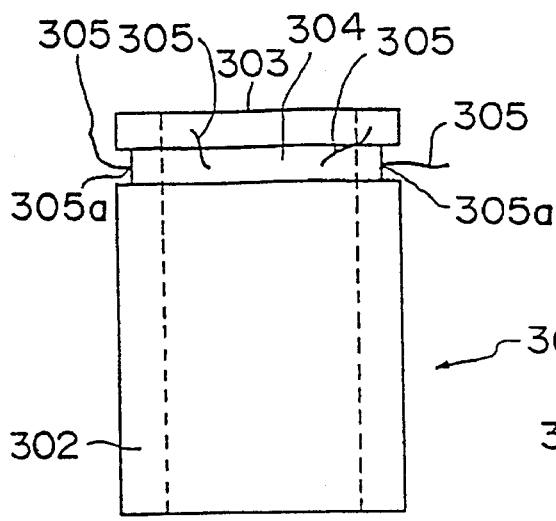
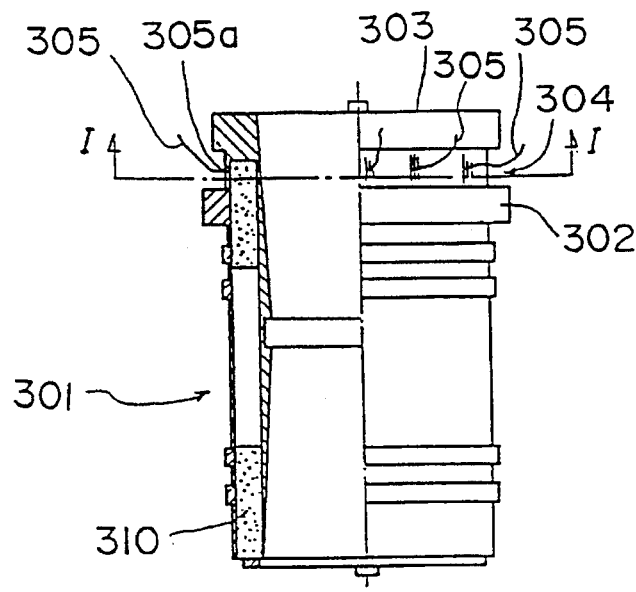
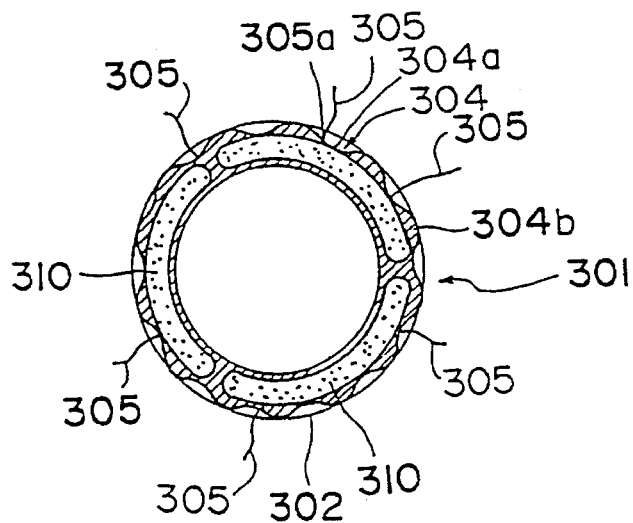

MOLD FOR FORMING A CORELESS ARMATURE

This is a division of application Ser. No. 908,774 filed Jul. 1,1992, now U.S. Pat. No. 5,304,884 which is a continuation of application Ser. No. 257,470 filed Oct. 13, 1988 now abandoned.

BACKGROUND OF THE INVENTION

1. Field of the Invention

The present invention relates to a mold and more particularly to a mold for fabricating coreless armatures.

2. Description of the Prior Art

As is already known, a brushless motor or alternating current motor, for example, the brushless motor, comprises a magnetic rotor provided with a permanent magnet fixed to the shaft thereof and a stator comprising a cylindrical coreless armature which is disposed around the rotor and which is provided on a case in the outside thereof. The coreless armature has a cylindrical shape formed by a plurality of specified turns of coil. The various types of coreless armatures available include one which is formed by a single layer coil and one which is formed by laminating two or more layers of coil. The latter type generally generates an increased output from the motor comprising this type of armature.

A prior art example producing this sort of coreless armature is a method in which armature coils are prepared in advance with a cup-like shape by self-welding wires, a necessary amount of solid resin is placed in a mold, the prepared armature coils are placed on the solid resin and covered with another mold so that the armature coils are molded into a desired shape and are fixed by charging the solid resin in the mold under heating (see, for example, Japanese Patent Laid-Open No.125061/1980).

Another example of prior art is a technique in which an attempt is made to reduce the thickness of an armature by adopting an arrangement in which coils are bent into U-shaped forms and disposed in two layers around a cylinder, one of the two layers having a larger diameter than the other in an overlapping portion (see, for example, Japanese Utility Model Laid-Open No.75702/1978).

Another type of armature is known which comprises a cylindrical armature winding formed by producing a plurality of winding units and then combining these winding units (see, for example, Japanese Utility Model Publication No. 31176/1981).

A technique concerning a molded stator has also been disclosed in Japanese Utility Model Laid-Open No.55906/1976 in which an outgoing lead wire for each of the phase coils and an outgoing lead wire for a hall element, provided for the purpose of detecting the positions of rotor magnetic poles, are connected to a printed board which is provided on the surface at one end of a cylindrical stator coil to form an independent structure as a unit. The Cylindrical armature disclosed in this publication is formed by inserting a plurality of armature windings which are wound or shaped in advance into a desired shape in a mold, and burying the windings in the heated resin in a semi-solidified state which is charged under pressure through a gate provided at an opening of the mold to be molded into a cylindrical form as a unit. The mold used for forming the bore portion of the cylindrical armature is generally formed as a unit from one end of the armature to the other end thereof, with a draft being provided so that the armature fixed by the resin can be easily separated from the mold. The above-described conventional cylindrical armature therefore has the bore inclined in one direction from one end to the other end thereof which is formed by the draft of the mold.

Coreless multi-layer armatures of the type formed by laminating two or more layers of coil have the problems described below with respect to the production thereof.

1. Although it is desirable that the linear portion of the winding of a coil which functions to generate torque is as large as possible, if this requirement is satisfied, the size of an armature is increased. In this case, even though the thickness of the armature can be reduced by a distributed winding in which conductors are arranged around the circumference of a cylinder without any gaps, anti-torque is produced according to the arrangement of the conductor. If a concentrated winding in which conductors are concentrated at portions near the boundary between magnetic poles is employed, even though no anti-torque is produced, there is a problem in that the thickness of the armature has to be increased.

2. A process of producing an armature in which coils arranged in a cylindrical form are fixed by molding with resin using a mold has the following problems:

(1) Although fixing of coils is perfomed by molding in a mold after they have been shaped into a cylindrical form so that they do not loosen, the coils are likely to lose their shape or become damaged when the coils are placed in the mold which is then closed.

(2) A means for fixing the coils in the mold by charging melted resin under pressure exhibits excellent efficiency in terms of mass production but involves the problem that the coils are sometimes deformed by the pressure of the resin used.

(3) Methods for resolving the problem described in (2) include a method in which coils are placed in a mold and resin which is liquid at room temperature is injected into the mold under reduced pressure and then solidified by heating, and a method in which solid resin is placed in a mold together with coils and then melted under pressure so as to penetrate between the coils. Such methods, however, involve certain disadvantages since these methods require many molds and much working time and thus lack efficiency in terms of mass production.

The technique disclosed in Japanese Patent Laid-Open No. 125061/1980 also has the following problems:

1. There is a possibility of producing deviations in the shape of coils or damaging the coils during the shaping of the coils that is performed by covering them with a mold.

2. It is very difficult to produce a large number of armatures.

The technique disclosed in Japanese Utility Model Laid-Open No. 75702/1978 also has the problems that coils are easily broken because they are bent in a complicated manner and that resin molding is extremely difficult.

The armature described in Japanese Utility Model Publication No. 31176/1981 must be provided with an insulating sheet to provide insulation between the iron core of a stator and the winding of the armature.

In the armature described in Japanese Patent Laid-Open No. 125061/1980 or an armature formed by pressure injection, portions of the winding of the armature which adhere to the surface of the mold are produced when the heated resin is poured or semi-solidified resin is-injected under pressure, and, when the armature is separated from the mold after solidification of the resin, the winding of the armature adhering to the mold is exposed to the air on the sides of the armature and on the end surface opposite to the gate through which the resin is injected. When the thus-formed armature is combined with a core or a case, therefore, the exposed portions of the winding of the armature are in some cases rubbed and produce short circuiting owing to vibrations caused by high-speed rotation during the use of the armature. Projecting edges are produced on the armature during assembly thereof and may sometimes bring about short circuiting upond contacting the core or the case. The above-described armature therefore involves the problems that an insulating member such as an insulating sheet or the like must be provided for the purpose of preventing any short circuiting and that the armature cannot be precisely combined with the core or the case because of the presence of projecting edges or burrs.

A revolving electric device of the type in which a printed board is fixed to one end of an armature and the terminals of the coils of the armature are connected to the printed board, as described above in the prir art, is generally of the type in which the terminals of the armature coils emerge from the end of the armature. In this case, in order to allow soldering of the terminals of the armature coils to the printed board, a hole or notch through which the terminals of the armature coils can be passed must be provided in the printed board, or the terminals of the armature coils must be held between the printed board and the end of the armature and extended to the side of the printed board. A hole or notch must therefore be provided in the printed board and this results in limiting the space available for printed wiring, as well as producing a problem with respect to the strength thereof. In order to remove this problem, the area of the printed board has to be increased, but since an increase in the area of the printed board runs counter to the desire to decrease the size of the armature, no attempt can be made to reduce the size of the latter in the above-described prior art.

In addition, in the above-described prior art, since the end from which the terminals of the armature coils emerge has a flat surface, the terminals of the armature coils are brought into contact with other parts or bent at their roots during work, resulting in a great risk of the breaking of wires. The operator therefore has to use excessive concentration in operating the armature and this greatly strains the nerves.

Furthermore, when the terminals of the armature coils are extended to the side of the printed board, the terminals of the armature coils are bent in a complicated manner or broken between the printed board and the end of the armature, resulting in the possibility of breaking the wires. There is therefore a disadvantage in that the operator's nerves are greatly strained.

The above-described cylindrical armature of the prior art also involves a problem in that the bore of the armature is inclined in one direction from one end to the other and thus shows a great difference in diameter between its two ends. The gap between the rotor and the winding in the stator is thus enlarged, adversely affecting the performance of the armature, particularly rotational torque. There is also a problem in that the armature winding inserted into the mold may be pushed on and adhered to the mold which forms the bore surface of the armature by the resin injected into the mold owing to pressure injection of the molding resin, and the armature may thus be formed with the winding exposed through the molding resin. When such an armature is assembled as a revolving electric device, the exposed portion of the armature winding thereof causes the shape of the armature to be changed to project toward the rotor side owing to vibrations and heat generated during high-speed rotation of the revolving electric device, and thus adversely affects the function of the armature.

SUMMARY OF THE INVENTION

An object of the present invention to provide a mold used in the manufacture of a coreless armature and avoid the aforementioned problem found in the prior art. The mold of the present invention, is used in the manufacture of a coreless armature comprising coils which are wound with a given phase in two or more layers around the circumference of a cylinder and which is molded into a cylindrical form by using resin, the coil pitch of the phase coils in each of the layers is set to be 125% or less of the pole pitch, and the gap between the respective phase coils in any one of the layers being so disposed as to face the internal space of each of the phase coils of the other layer being in contact with that layer.

A method of producing the coreless armature configured as described above which is formed by winding coils with a given phase in two or more layers around the circumference of a cylinder and molding them into a cylindrical form using resin is characterized by disposing the gap between the respective phase coils in any one of the two or more layers so as to face the internal space of each of the phase coils of the other layer being in contact with that layer and by charging resin under pressure into the internal space of each of the phase coils of the other layer through the gap between the respective phase coils during molding of the armature.

The molding of the periphery of the coreless armature configured as described above is preferably performed by using a mold with a mold registering surface which is so formed as to be parallel with the axial direction of the armature.

In the coreless armature configured as described above, the resin is injected and charged in a well-balanced manner into the space on the inside of the other layer facing the gap between the respective phase coils in each of the layers and through the gap.

Furthermore, when the periphery of the armature is molded, the mold can be slowly registered and closed in the radial direction.

The mold of the present invention is used in a process for producing an armature for a revolving electric device which comprises leading out the terminal of each armature winding from the resin used for molding the armature to the outside thereof by using a transfer molding method, particularly a low-pressure transfer molding method. To this end, the method is characterized in that each of a plurality of armature windings which are wound in advance to form a desired shape is placed at a given position in a mold used for molding, the terminal of each of the armature windings is lead out to the upper surface of the mold and then fixed under pressure through an elastic ring member, and a synthetic resin material used for molding is charged into a space which is formed by the inner wall of the elastic ring member, and the mold and the armature windings.

Since the low-pressure transfer molding method is used in the manufacture of the coreless armature a thermosetting resin such as epoxy resin which is raw resin is kneaded with additives and then solidified, and the solidified material is heated in the mold for molding and pressed so that the armature windings previously placed at the given positions in the mold are encased and fixed in place by the resin. During this molding, the way in which the terminals led out from each of the armature windings in the mold is important and it is also critical that only the terminals are led out from the resin of the armature after molding. In the present invention, an elastic resin plate having heat resistance is used so that the terminals are arranged between the resin plate and the mold and buried in the elastic resin plate because the elastic resin plate is appropriately deformed by compression between upper and lower molds when these molds are closed, whereby any leakage of the material used for molding can be prevented. After the armature has been molded, the terminals alone can be led out from the resin of the armature by simply opening the molds and removing the elastic resin plate. An armature made with the mold of the present invention can be produced by a transfer molding method, particularly a low-pressure transfer molding method, with a high level of productivity being maintained, and which requires no insulating member even if the armature has exposed portions in the armature windings, and which also can be precisely assembled without being affected by projecting edges and burrs produced by molding. To this end, a plurality of armature windings which are previously wound to form a desired shape are integerally buried in a molding resin material by molding to form a cylindrical shape, and convex portions are provided on the sides of the armature which are fixed to the core or the case of a revolving electric device so as to serve as receiving surfaces when the armature is fixed to the core or the case, as well as to able to provide a gap between the armature and the core or the case.

An object of the present invention is to produce an armature for a revolving electric device which is reduced in size and in which breaking of the terminals of armature coils is prevented. To this end, in an armature for a revolving electric device comprising a plurality of armature windings which are wound in advance to form a desired shape and which are integrally buried in a molding resin material by molding to form a cylindrical shape. The terminal of each of the armature windings is led out from a groove provided near one end of the armature so that an attempt can be made to reduce the size of the, armature and the risk of breaking of any of the terminals of the armature coils can be completely eliminated. In addition, since none of the terminals of the armature coils is either broken or rubbed during assembly of the armature because it is held between a printed board and the end of the armature, the level of strain imposed on workers can be significantly lowered.

To achieve this object, in an armature for a revolving electric device comprising a plurality of armature windings which are each wound in advance to form a desired shape and which are integrally buried by molding in a molding resin material to form a cylindrical shape, and a printed board which is provided at one end of the cylindrical molded shaped, a groove through which the terminals of the armature windings are led out is provided in the periphery of a cylindrical molded shape and the external diameter of a portion for introducing the terminals of the armature windings in the periphery of the cylindrical molded shape is made small so that a space for introducing the terminals of the armature windings is formed between the the cylindrical shape and the internal periphery of the body of the revolving electric device, whereby an attempt can be made to reduce the size of the armature.

The present invention can be used to fabricate an armature for a revolving electric device in which there is no difference in the internal diameter formed by the draft of a mold and no portion of the armature windings exposed to the molding resin. To this end, in an armature for a revolving electric device comprising a plurality of armature windings which are each wound in advance to form a desired shape and which are integrally buried by molding in a molding resin material to form a cylindrical shape, the bore portion of the armature is formed by a resin film which is composed of the molding mesin material and which has a surface outwardly inclined from an appropriate position on the bore surface toward both ends thereof, whereby the gap between a rotor and a stator can be reduced and exposure of the armature windings can be prevented.

BRIEF DESCRIPTION OF THE DRAWINGS

FIG. 5 is an explanatory perspective view of the state wherein a divided mold is opened;

FIG. 6 is a sectional view of the configuration of an apparatus for performing a method of producing an armature for a revolving electric device of another embodiment to which the present invention relates;

FIG. 15 is a front view of a further embodiment of the armature for a revolving electric device;

FIG. 16 is a half sectional front view of a still further embodiment of the armature for a revolving electric device;

FIG. 17 is a sectional view taken along the line I—I of FIG. 16 as viewed from the arrow shown in FIG. 16;

FIGS. 21 and 22 are drawings of a further embodiment of the armature, in which FIG. 21 is a sectional view of the armature and FIG. 22 is an explanatory view of a state of the armature molded; and FIG. 23 and 24 are drawings of a still further embodiment of the armature, in which FIG. 23 is a sectional view of the armature and FIG. 24 is an explanatory view of a state of the armature molded.

DETAILED DESCRIPTION OF THE PREFERRED EMBODIMENTS OF THE INVENTION

Embodiments of the present invention are described in detail below with reference to the drawings.

Figure 1:
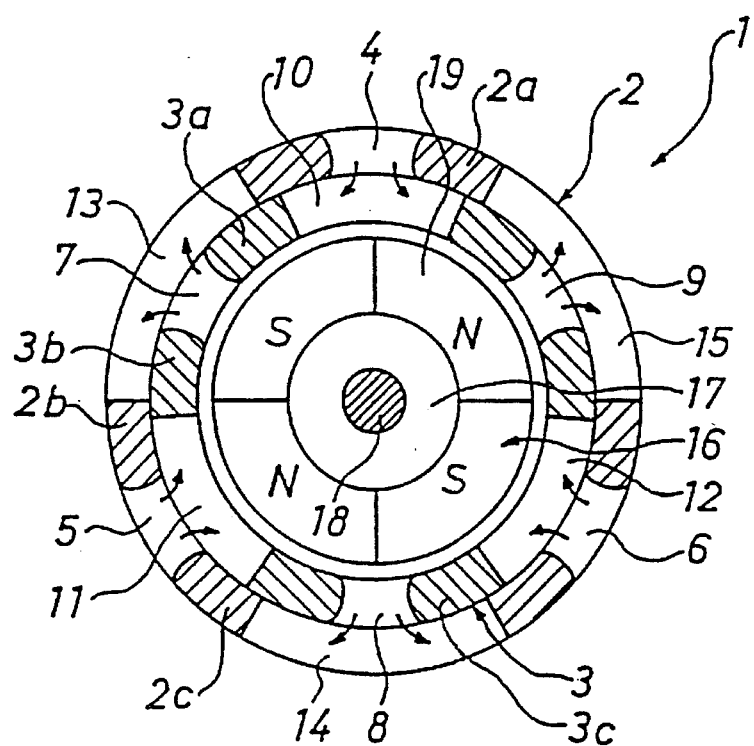
FIG. 1 is a plane cross section of an embodiment of a coreless armature to which the present invention relates.

FIG. 1 shows an embodiment of a coreless armature 1 which can be made using the mold of the present invention.

This drawing shows as an example an armature which is used for a three-phase brushless motor and which comprises six coils.

As shown in the drawing, the coreless armature 1 comprises armature coils in two layers (the number of layers may be two or more and is not limited to two) comprising external layer coil 2 and internal layer coil 3 and has a cylindrical form. Phase coils 2a, 2b, 2c in three phases of the exteranl layer coil 2 are so provided as to respectively form gaps 4, 5, 6 therebetween (see FIG. 2c). Similarly, phase coils 3a, 3b, 3c in three phases of the internal layer coil 3 are also provided so as to respectively form gaps 7, 8, 9 therebetween. The gaps 4, 5, 6 between the respectively phase coils 2a, 2b, 2c in the three phases of the external layer coils 2 are so disposed as to face the internal spaces 10, 11, 12, respectively, of the phase coils 3a, 3b, 3c in the tree phases of the internal layer coil 3. The gaps 7, 8, 9 are also disposed so as to face the internal spaces 13, 14, 15, respectively, of the external layer coil 2.

Figures 2A, 2B:
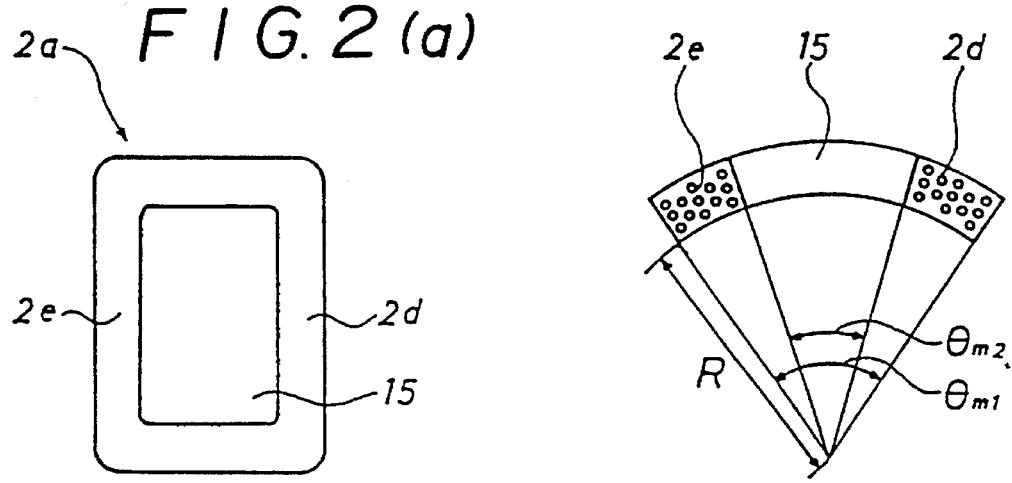
FIGS. 2a, 2b and 2c are explanatory views of principal portions of the embodiment shown in FIG. 1.
Figure 2C:
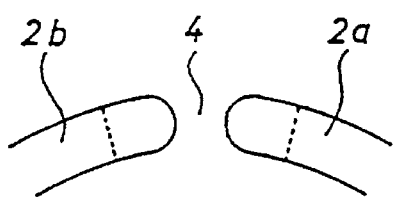

Each of the phase coils 2a, 2b, 2c, 3a, 3b, 3c comprising the external layer coil 2 and the internal layer coil 3 is formed into the shape shown in FIG. 2a (showing as an example the phase coil 2a of the external layer coils 2) by means of a winding machine (not shown) using self-welding wires. Reference numerals 2d and 2c denote coil pieces.

The thus-formed phase coils 2a to 2c and 3a to 3c are bent along the circumference of a cylinder to form an arch-like shape with a given radius R and is disposed as the coils 2, 3 in the two layers to from the cylindrical coreless armature 1. The angle $\theta m_1$ (corresponding to the coil pitch) facing the coil width (coil pitch ) of each of the phase coils (for example, the phase coil 2a) which are bent to form arch-like shapes with the given radius R is set to be about 110° . The angle $\theta m_2$ facing the internal periphery of each of the coil pieces 2d and 2c is set to be 65° to 75° . Since the angle corresponding to the pole pitch is 90°, the angle corresponding to the coil pitch of each of the phase coils in this embodiment is set to a value of about 1.2 time the pole pitch. In other words, the width of each of the coil pieces 2d, 2e is so set as to have an extent of about 20° toward the adjacent coil and about 20° toward the center of the coil from the boundary between magnetic poles seving as a center.

The corelss armature 1 configured as described above is adhered to the inside of the case (not shown) of a motor composed of a magnetic substance. The case forms magnetic paths in combination with a yoke 17 of the side of a rotor 16. The yoke 17 is fixed to a shaft 18 and provided with a permanent magnet 19 which is fixed thereto and divided into four equal portion along the circumference of a cylinder to form the four-pole rotor 16.

A description will now be given of a method of producing the coreless armature configured as described above.

Figure 3A:
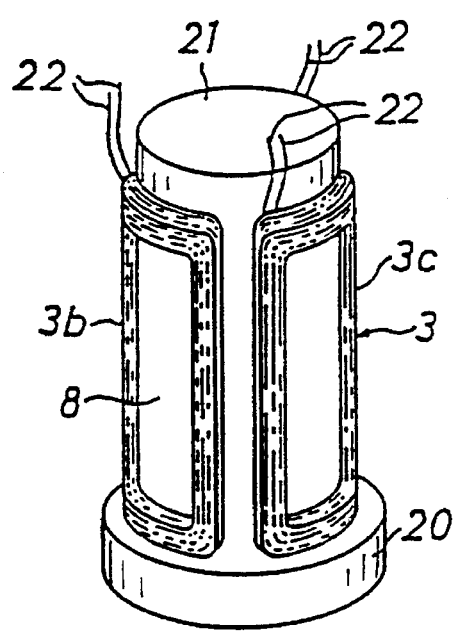
FIGS. 3a, 3b are explanatory views of a process for producing an armature.

The three phase coils 3a, 3b, 3c which are formed as shown in FIG. 3a are first prepared, then arranged substantially at equal intervals along the periphery of an internal mold 21 on a base 20 and temporarily fixed by a tape (not shown) to form the internal layer coil 3. In the drawing, reference numeral 22 denotes the terminal of each coil.

Figure 3B:
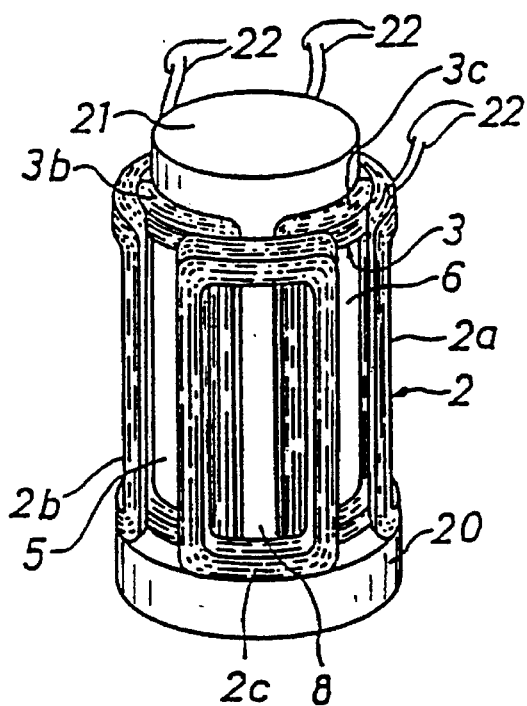

As shown in FIG. 3, the three phase coils 2a, 2b, 2c comprising the external layer coil 2 are then respectively arranged on the external surface of the internal layer coil 3 and temporarily fixed by a tape in the same way as the internal layer coil 3.

The phase coils 2a to 2c of the layer ocil 2 and 3a to 3c of the layer coil 3 are positioned so as to be symmetrical in the peripheral direction of each of the layers. Such positioning causes the gaps 4, 5, 6 between the respective phase coils 2a to 2c and the gaps 7, 8, 9 between the respective phase coils 3a to 3c to be substantailly the same as each other. This positioning is performed so that the gaps 4, 5, 6 between the respective phase coils 2a, 2b, 2c and the gaps 7, 8, 9 between the respective phase coils 3a, 3b, 3c in the layer coils 2, 3 respectively face the corresponding internal spaces 10, 11, 12, 13, 14, 15 of the phase coils.

Figure 4:
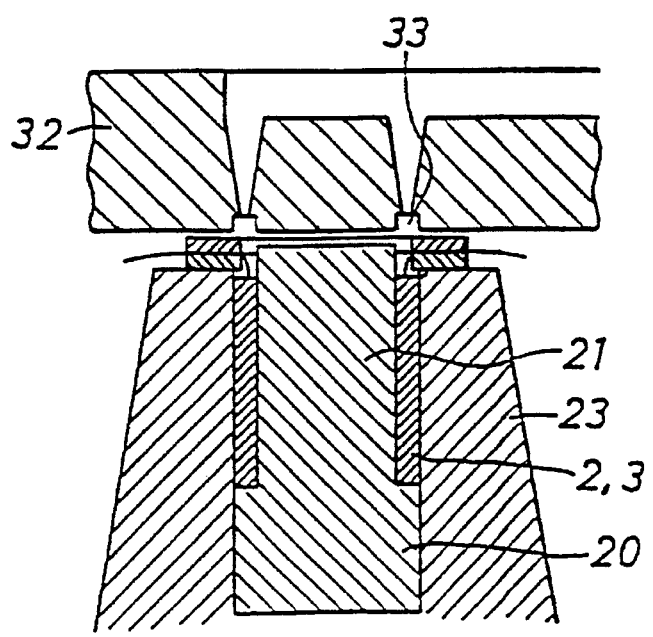
FIG. 4 is a sectional view of a mold used for charging resin.

As shown in FIG. 4, an outer mold 23 is then placed on the coils which are positioned as described above. The outer mold 23 for molding the armature has a divided form comprising two mold pieces 23a, 23b, as shown in FIG. 5. The mold registering faces 30, 31 of the molds pieces 23a, 23b are so formed as to be parallel to the axis of the coreless armature 1. When the mold 23 is placed on the coils, the mold pieces 23a, 23b are registered by using the mold registering faces 30, 31.

After the outer mold 23 has been registered and closed, molten resin is injected under pressure into the mold from the resin injection hole 33 of the resin injection molding machine 32 shown in FIG. 4. The resin injected flows to the layer coils 2, 3 in the following path of inflow: The resin is caused to flow into the mold while passing through the gaps 4, 5, 6, 7, 8, 9 between the respective phase coils in the layers shown in FIG. 1, the resin flowing into the gaps 4, 5, 6 of the external layer coil 2 being caused to flow and charged into the corresponding internal spaces 10, 11, 12 of the phase coils 3a, 3b, 3c of the internal layer coil 3, and the resin flowing into the gaps of the internal layer coil 3 being caused to flow and charged into the corresponding spaces 13, 14, 15 of the phase coils 2a, 2b, 2c of the external layer coil 2, as shown by the arrows in the drawing.

During the above-described process, the external layer coil 2 and the internal layer coil 3 are fixed by transfer molding using the resin to obtain the coreless armature 1.

As described above, in the present invention, since the phase coils 2a to 2c of the external layer coil 2 and the phase coils 3a to 3c of the internal layer coils 3 each have the coil pitch (the width of each of the phase coils) which is set to be 1.25 times or less the pole pitch and are arranged in two layers to form a cylindrical shape and then subjected to transfer molding, the invention displays the following effects:

(1) Since the conductors of the coils are arranged around the periphery with good efficiency, the output per unit area of a motor is increased.

(2) The use of transfer molding facilitates mass production of armatures.

(3) Since the coil pitch (the width of each phase coil) of each of the phase coils 2a to 2c and 3a to 3c is set to be 1.25 times or less one pole pitch, no or only small anti-torque is produced.

(4) Since the gaps 4, 5, 6 between the respective phase coils 2a to 2c and the gaps 7, 8, 9 between the resepective phase coils 3a to 3c are symmetrically placed in each of the two layers, and the resin is passd through the gaps 4, 5, 6, 7, 8, 9 and caused to flow and charged into the internal spaces 10 to 12 and 13 to 15 which are so disposed as to face the corresponding gaps 4, 5, 6, 7, 8, 9, the path of inflow of the resin can be secured. In addition, since the pressure of the resin is well balanced in the peripheral direction during injection of the resin and the coils are held by the external mold 23 in the radial direction thereof, the coils is neither deformed nor damaged.

(5) Since the mold registering faces 30, 31 of the external mold 23 are so formed as to be parallel with the axial direction of the coreless armature 1, the coils can be slowly held in the radial direction, resulting in no deviation in the positions of the coils.

(6) Since the layer coils 2, 3 are fixed by the resin, the strength of the armature 1 can be secured.

Figure 7:
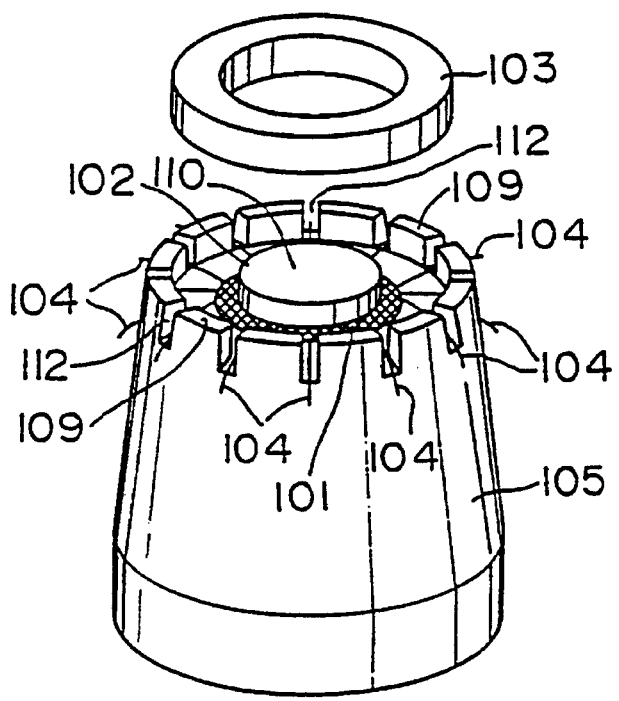
FIG. 7 is a perspective view of the state wherein armature windings are inserted into an lower mold for molding.

FIG. 6 is a sectional view of the configuraiton of a mold of another embodiment to which the present invention relates, and FIG. 7 is a perspective view of a lower mold for molding.

Figure 8A:
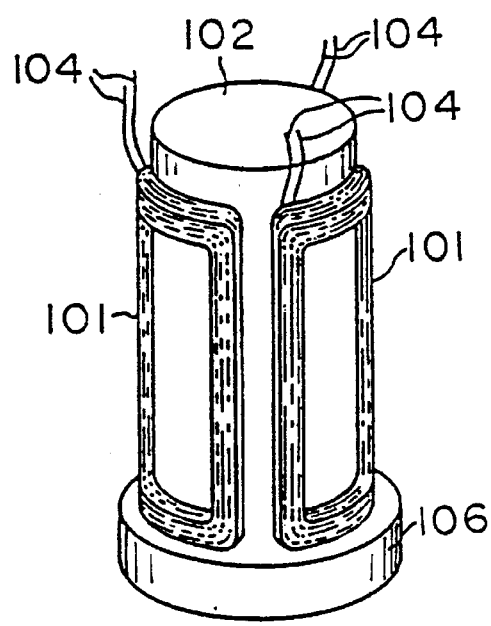
FIG. 8 is a perspective view of armature windings wound around the shaft of a mold.
Figure 8B:
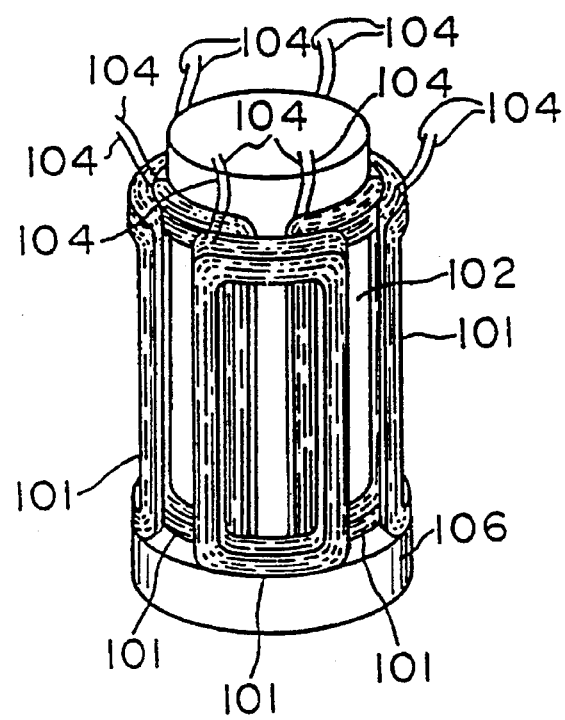

A plurality of armature windings 101 are first wound around a shaft 102 which is a member of a lower mold 105, as shown in FIG. 8a or 8b. The lower mold 105 has an opening in an upper portion thereof and a concave portion for receiving the shaft 102 around which the armature windings 101 are wound. On the opening of the lower mold 105 is disposed an elastic resin ring plate 103 (for example, made of silicone rubber) having heat resistance which is tolerable molding by thermosetting resin. In other words, this elastic resin ring plate 103 is interposed between the lower mold 105 and a runner plate 107 of an upper mold 113 so as to be deformed by compression during closing of these molds because the runner plate 107 is brought into contact with the upper surface 109 of the lower mold 105 and the upper surface of 110 of the shaft 102 which have the same height. The upper mold 113 comprises the runner plate 107 and a fixed plate 114 which is provided on the upper side thereof and which has an opening 115. This opening 115 forms a chamber, i.e., a pot, in combination with a concave portion 101b provided in the runner plate 107. The runner plate 107 has a plurality of transfer injection ports (gates) which are provided in a circular form in the surface thereof being in contact with the lower mold 105 and which communicate with the pot. A solid material (tablet) which is formed by kneading thermosetting resin of raw resin-such as epoxy resin with additives and solidifying the obtained mixture can be therefore charged into the pot, softened by heating, and pressed by a plunger 117 so as to be transferred to the void formed in the lower mold 105.

The gate 108 provided in the runner plate 107 is so disposed as to be positioned in the inside of the elastic resin plate 103.

A description will now be given of a method of molding in due order below.

The shaft 102 around which the armature windings 101 are wound is first inserted into the concave portion of the lower mold 105. The terminals 104 led out from the plurality of armature windings 101 are then disposed in a slit which is provided in the wall of the periphery in the upper surface of the lower mold 105. The elastic resin ring plate 103 having an external diameter equal to the internal diameter of the above-described wall is then placed on the terminals 104. When a molding machine is started, the space between a stage 106 on which the lower mold 105 is mounted and the runner plate 107 of the upper mold 113 is reduced so that the lower suface of the runner plate 107 is brought into contact with the upper surface 109 of the lower mold 105 and the upper surface 110 of the shaft 102 while deforming the elastic resin plate 103 by compression. The terminals 104 are therefore buried in the elastic resin plate 103, without any leakage of the molding resin injected from the gate (transfer injection hole) 108 taking place. After the molding resin has been set, the molding molds are opened, and the elastic resin plate 103 is removed. An armature charged with the molding material with the terminals 104 emerging therefrom can be obtained by, for example, inserting an ejection pin from a hole 111 provided in a lower portion of the lower mold 105 to push the shaft 102. When the shaft 102 is then removed, a complete armature can be obtained.

In the aforemetioned embodiment, although the lower mold 105 is separated from the stage (mold) of the molding machine, it is matter of course that the lower mold 105 may be formed in conbination with the stage. In cosideration of the risk of damaging the shaft 102 owing to great force generated at closing of the molds, a burr or a thin film may be formed between the surface 110 of the shaft 102 and the runner plate 107 so that the closing force acts on only the surface 109 of the mold 105, and the burr may be removed after molding. The shaft may also be formed in combination with the lower mold 105.

Figure 9:
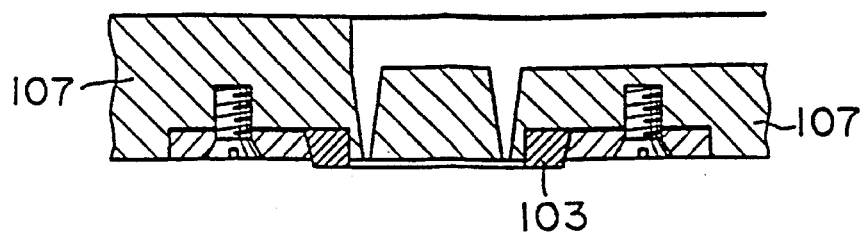
FIGS. 9 to 11 are sectional views of modified examples of the method of the present invention.

FIG. 9 shows an example in which the elastic resin plate 103 is fixed to the runner plate 107 and the other members are the same as those shown in FIG. 6. This example can remove the processes for attaching and detaching the elastic resin plate 103 and thus reduce the number of processes for each shot.

Figure 10:
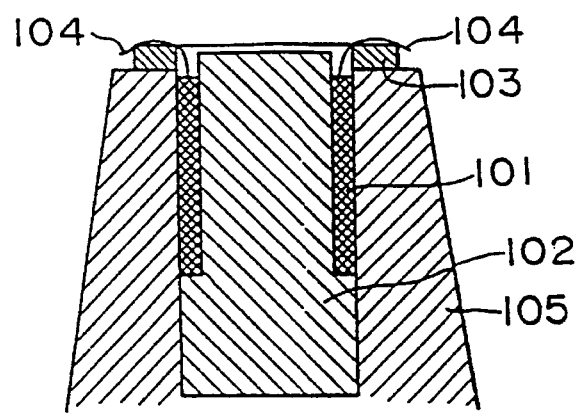

FIG. 10 shows an example in which the terminals of the armature windings 101 are placed on the upper side of the elastic resin plate 103. This example enables the terminals 104 to be led out from the end of the armature after molding and a certain degree of freedom to be obtained when the armature is matched to the internal structure of a revolving electric machine.

Figure 11:
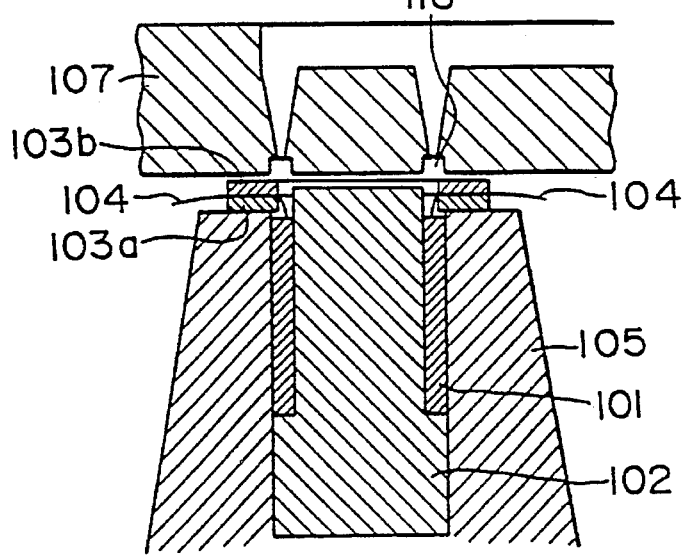
Figure 12:
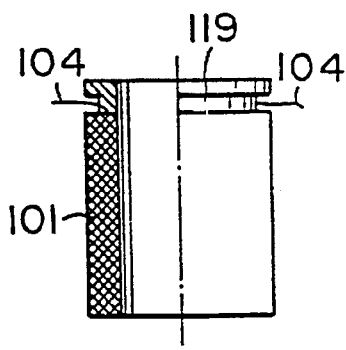
FIG. 12 is a partially sectional side view of armature windings produced by the method shown in FIG. 11.

FIG. 11 shows an example in which the terminals 103 are held between two elastic resin plates 103a and 103b and in which the internal diameter of the elastic resin plate 103 is smaller than the diameter of a hole in which the armature windings 101 are inserted. A ring groove 118 is also provided in the runner plate 107. FIG. 12 shows the shape of the armature which is molded by a mold having the structure of this example. In this example, the terminals 104 of the armature windings 101 are led out from the wall of the concave portion 119 and thus the roots of the terminals are not easily brought into contact with fingers or other parts during work, with the effect of preventing any breaking of wires resulting.

Figure 13:
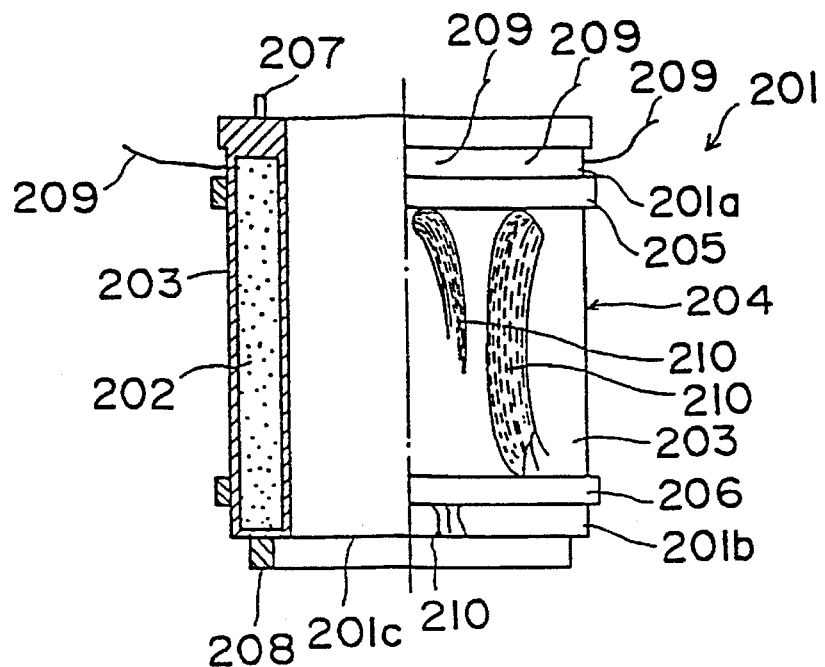
FIG. 13 is a partially sectional front view of another embodiment of the armature for a revolving electric device

FIG. 13 is a partically sectional front view of still another embodiment of an armature for a revolving electric device to which the present ivnention relates. In the drawing, reference numeral 201 denotes an armature having a plurality of armature windings 202 which are fixed by a resin material 203 for molding to be buried therein. The armature 201 has convex ring portions 205, 206 which have the same height (thickness), which are respectively provided at both ends 201a, 201b of the periphery 204 thereof by integral molding using the above-described resin material. The armature 201 also has a concave ring portion 208 which abuts against a case (not shown) and which is provided by integeral molding at an end 201c of the armature 201 opposite to a gate portion 207 through which molding resin is injected in the same way as that described above. Referene numeral 209 denotes the terminals of armature windings 202 which are led out from the molding resin 203, and reference numeral 210 denotes exposed portions of the armature windings 202 which are adhered to the suface of the mold by being pushed by the molding resin 203 injected and exposed through the surface of the resin 203.

In the armature 201 having the structure of this embodiment, the convex ring portions 205, 205 provided in the periphery 204 thereof can prevent the exposed portions 210 of the armature windings 202 in the periphery 204 thereof from being brought into contact with a core or a case when the armature 201 is combined with the core or the case. The concave ring portion 208 which is provided at the end 201c of the armature 201 can also prevent the exposed portions of the armature windings 202 at the end 201c from being brought into contact with the case. In additon, the convex ring ortions 205, 206 and 208 causes projecting edges, burrs or the like which are produced during molding by the molds to give only small effects when the armature 201 is combined with the core or the case.

As described above, the armature of this embodiment enables a rovolving electric device which requires no insulating member such as an insulating sheet between the armature and the core or the case to be obained. The armature can be also precisely combined with the core or the case without being affected by projecting edges or burrs.

The convex ring portions 205, 206 and 208 may be provided by mounting convex portions made of a non-conductive member on the armature. In this case, the same function and effect as those described above can be exhibited.

Figure 14:
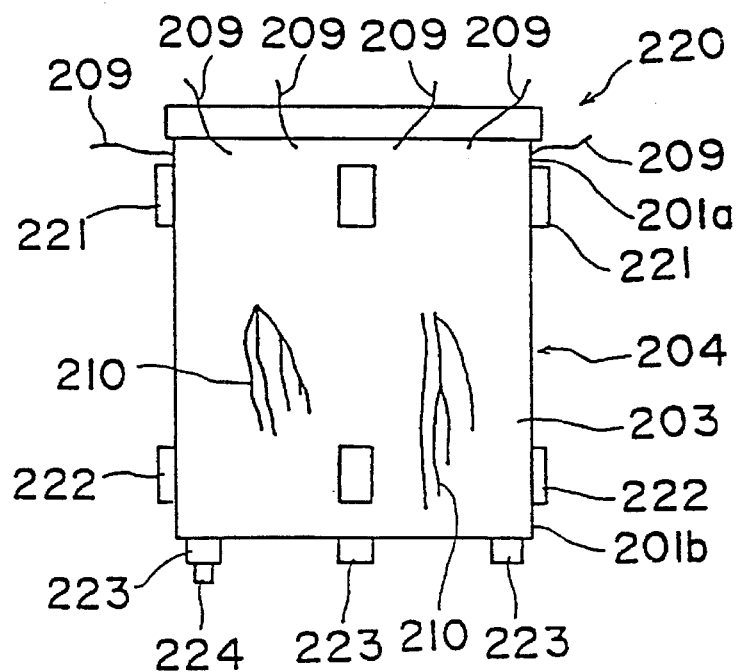
FIG. 14 is a front view of still another embodiment of the armature for a revolving electric device.

FIG. 14 is a front view of a further embodiment of an armature for a revolving electric device to which the present invention relates.

An armature 220 of this embodiment comprises convex ring portions and a convex abutting ring portion which have shapes different from the convex ring portions 205, 205 and the convex abutting ring portion 208 of the above-described embodiment. Since other members are the asme as those of the above embodiment, they are denoted by the, same reference numerals and are not described below.

The armature 220 has a plurality of convex portions 221, 222 which are provided near the ends 201a, 201b of the periphery 204 thereof by integral molding using the above-described molding resin material, these convex portions 221, 222 being formed as to have the same height (thickness), whereby exposed portions 201 of armature windings 220 (not shown) exposed from the periphery 204 of the armature 220 can be prevented from being brought into contact with a core or a case. The armature 220 also has a plurality of convex portions 223 which each have a boss-like form, which abut against the case (not shown) and which are provided at the end 201c of the armature 220 by integral molding so that the exposed portions 201 of the armature windings (not shown) exposed at the end 201c can be prevented from being brought into contact with the case. On one (specified) of the abutting convex portions 223 is provided a projecrion 224 used of positioning the case and the armature 220. Although this embodiment shown in the drawing has the convex portions 221, 222 and 223 which each comprise four portions provided at equal intervals, the numer of portions is not limited to four, and the convex porions 221, 222 and 223 may be appropriately provided.

As described above, the armature of this embodiment can display the same function and effect as those described above.

FIG. 15 is a front view of a still further embodiment of an armature 301 to which the present invention relates.

As shown in the drawing, the armature 301 comprises a plurality armature coils (referred to as armture coil windings and not shown in the drawing) which are wound in advance to form a desired form and which are integerally molded into a cylindrical shape by a synthetic resin material 302 used for molding.

A ring groove 304 which intersects at right angles the axial direction of the armature 301 and which has a given depth is provided at a position near the end 303 thereof. The temrinals 305 of the armature coils which are buried in the synthetic resin material are led out to the outside thereof. Reference numeral 305adenotes the roots of the terminals of the armature coils.

The armtaure 301 configured as described above exhibits the following effects:

(1) Since there is no need of providing a hole or a notch which prevent the reduction in the size of the armture, the area of the printed board can be set to a minimum necessary size, i.e., a minimum size in view of a space available for printed wiring and the strength thereof, whereby an attempt can be mae to reduce the size of the armature 1.

(2) Since the roots 305a of the terminals 305 of the armature coils are led out from the groove which is formed so as to be one step lower than the periphery of the armature coils 301, the terminals 305 of the armature coils are not forced to be bent at the roots 305a thereof during assembly. As a result, none of the roots 305a of the terminals 305 of the armature coils is either brought into contact with other parts or repeatedly folded during work such as assembly. It is therefore possible to secure that the risk of breaking wires is prevented during work and to significantly reduce the nerve strain of the worker during work.

(3) Since the terminals 305 of the armature coils need not be extended to the side of the printed board, the terminals 305 of the armature coils are not held between the printed board and the end 303 of the armature, and thus they are neither folded in a complicatd manner nor broken between the printed board and the end 303 of the armature. As a result, in the same manner as described above in (2), it is possible to secure that the risk of breaking the terminals is prevented and to significantly reduce the nerve strain of the worker.

FIGS. 16 and 17 show another embodiment of the armture 301 to which the present invention relates, FIG. 6 being a front view with sectioned left half and FIG. 7 being a sectional view taken along the line I—I of FIG. 16 as viewed from the arrow shown in FIG. 16.

In this embodiment, the groove 304 shown in FIG. 15 is so formed as to have a plane cross section of a waveform so that the terminals 305 of the armture coils (armature windings) are led out from the troughs 304aof the waveform. The diameter of the periphery formed by the crests 304b is set to substantially the same as the external diameter of the armture 301. As a matter of course, the form of the plane cross section of the goove 304 is not limited to teh waveform. Since other members are the same as those shown in FIG. 15, they are denoted by the same reference numerals and are not described below.

In the aforementioned configuration, since the molded portion (the portion of synthetic resin used for molding) which forms the crests 304b serves as a reinforcing portion, it is possible to secure that any reduction in the mechanical strength of the armature 301 caused by forming the groove 304 is prevented. Since other effects are the same as those achieved by the above-described embodiments, they are not described below.

Figure 18:
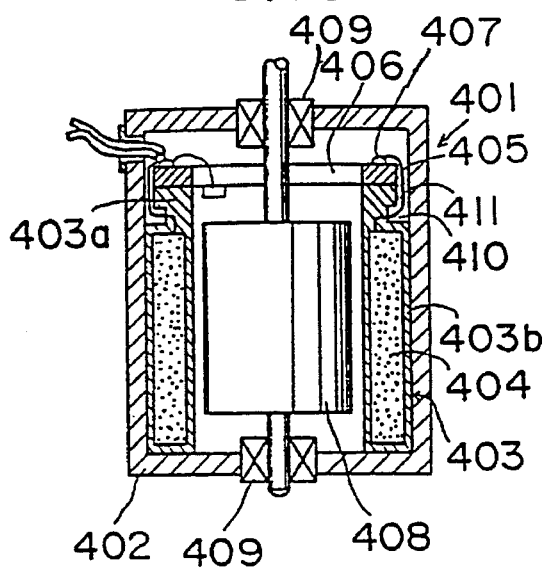
FIG. 18 is a sectional front view of another embodiment of a revolving electric device equipped with an armature.

FIG. 18 is a sectional front view of a revolving electric device 401 equipped with the armature to which the present invention relates. In this drawing, reference numeral 402 denotes a case; reference numeral 403, molding synthetic resin which is used for fixing by molding a plurality of armature coils (armature windings) 404 which are wound in advance to form a desired shape so as to be buried therein to form a cylindrical armature; reference numeral 405, the terminals of the armature coils; reference numeral 406, a printed board having connection between the armature coils and the terminals 405 ; reference numeral 408, a rotor; and reference numeral 409, a bearing.

A ring groove 410 is formed in the periphery of a portion of molded synthetic resin 403a between the armature coils 404 and the printed board 406, the external diameter of the portion of the molded synthetic resin portion 403a that is closer to the printed board 406 than the groove 410 is set to a value smaller than the diameter of the internal periphery of a case 402. In other words, although the external diameter of the periphery of the molded portion 403b of the armature coils 404 in the synthetic resin portion is set to substantially the same as the internal diameter of the case 402 so as to be brought into contact with the internal periphery of the case 402, the external diameter of the portion of the molded synthetic resion portion 403 closer to the printed board 406 than the ring groove 410 is set to a value smaller than that external diameter of the molded portion 403b. There is therefore a suitable space 411 formed between the internal periphery of the case and the periphery of the portion of the molded synthetic resin portion 403 closer to the printed board 406 than the groove 410. This space 411 may be set to have a size which makes it possible to pass the terminals 405 of the armature coils 404 therethrough.

Since the external diameter of the printed board 406 is set to substantailly the same as the external diameter of the portion of the molded synthetic resin portion 403 closer to the printed board 406, a space 411 is also formed between the printed board 406 and the internal pheriphery of the case 402.

As the above-described configuration enbales the terminals 405 of the armature coils 404 to be connected to a connetion portion 407 of the printed board 406 through the ring groove 410 and the space 411, the terminals 405 of the armature coils 404 are not rubbed by the case (or a core). As a result, it is possible to ensure that any occurrence of breaking of the terminals 405 of the armature coils 404 and short circuit thereof are prevented and to make an attempt to improve the quality and reliability of of the revolving electric machine. In addition, since there is no need of providing a hole or a notch for leading out the terminals 405 of the armature coils 404 in the printed board 406, the size of the printed board 406 can be set to a minimum necessary size, i.e., a minimum size in view of a space for printed wiring and and the strength thereof. As a result, it is possible to meke an attempt to reduce the size of the armature (make the armature compact) in the revolving electric machine 401.

Figure 19:
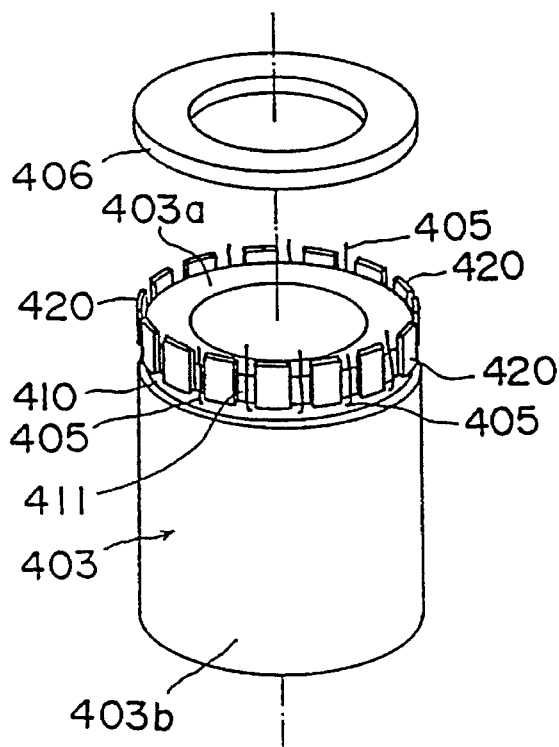
FIG. 19 is a perspective view of still another embodiment of the armature.
Figure 20:
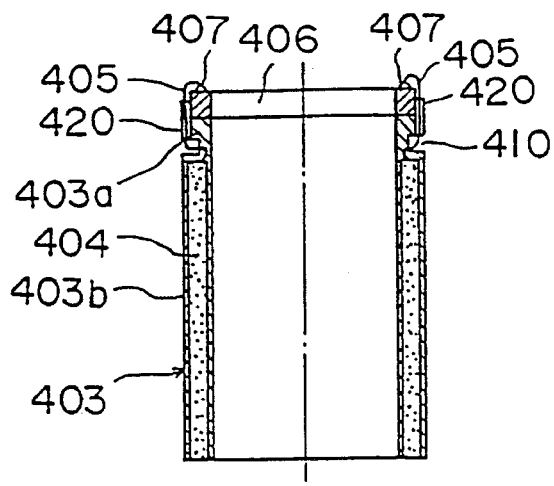
FIG. 20 is a sectional front view of a principal portion of the armature shown in FIG. 19.

FIGS. 19 and 20 show a still other embodiment of the present invention. This embodiment has a fin portion 420 for guiding the printed board 406 which is provided in the external periphery of the portion of the molded synthetic resin portion 403a closer to the printed board 406. The fin portion 420 is provided in the external periphery of the molded synthetic resin portion 403a except for the poriton for introducing the terminals 405 of the armature coils 404. The external diameter of the fin portion 420 is set to the same as or a value smaller than the external diameter of the molded portion 403b of the armature coils 404. The axial height of the armature is so set that the end of the marature is above the end of the molded synthetio resin portion 403a, whereby the printed board 406 can be guided. Since tther members are the same as those shown in FIG. 18, they are denoted by the same reference numerals and are not described below.

The above-described configuration exhibits the function and the effects attained by the aforemetioned embodiments, as well as having an effect of improving the workability of setting and assembling the printed board at a given position.

Figure 21:
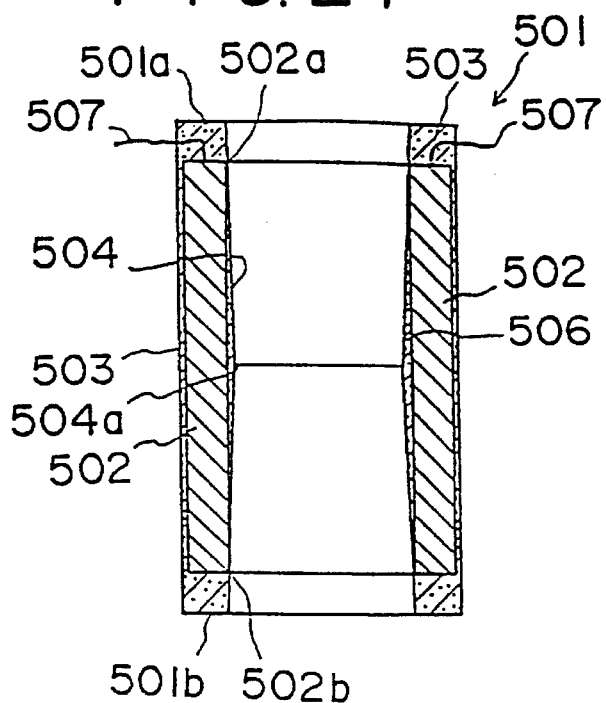

FIG. 21 is a sectional view of a further embodiment of an armature for a revoling electric device to which the present invention relates.

In the drawing, reference numeral 501 denotes an armature comprising a plurality of armature windings 502 which are wound in advance to form a desired shape and are integrally buried in molding resin 503 to form, a cylindrical. The armature 501 also has a resin film 506 which is formed in the internal periphery 504 of the armature 501 in such a manner that it becomes thick substantially in a central portion 504 and gradually thin in the directions from substanitally the central portion 504 to both ends 501a and 501b of the armature 501 so that only small portions at the both ends 502a, 502b of the armature windings are exposed from the resin film 506. Reference numeral 507 denotes the terminals of the armature windings led our from the molding resin 503.

Figure 22:
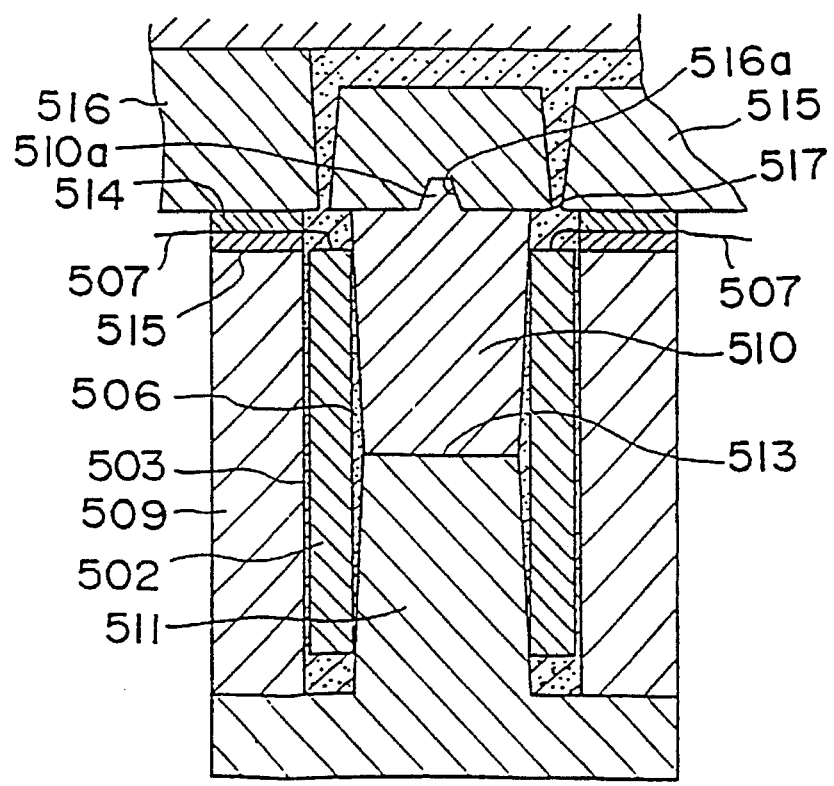

A description will now be given of the formation of the above-described armature 501 with reference to FIG. 22.

The plurality fo armature windings 502 which are wound in advance to form a desired shape are first inserted into a concave portion 512 which is formed by a side mold frame 509, an upper mold 510 and a lower mold 511. The upper mold 510 and the lower mold 511 form the bore surface 504 fo the armature 501. Each of the upper mold 510 and the lower mold 511 has a draft which is formed so that the diameter thereof gradually decreases toward the end thereof and so as to form a space 512 having a triangular sectional form between the armature windings 502 and each of the molds 510 and 511 during closing the molds. Reference numeral 513 denotes butting faces of the two molds 510, 511 which are adhered to each other when the molds are closed. The openings of the molds are respectively provided with elastic ring member 514, 515 which each have heat resistance and are made of silicone rubber so that the terminals 507 of the armature windings 502 are held between these elastic ring members 514, 515. In this state, a projection 510 for positioning which is provided on the upper mold is engaged with a concave portion 516b for positioning which is provided in a runner plate 516, and molding resin 513 is injected into the spaces 512 through a gate 517 provided in the runner plate 516. The armature windings 502 are buried in the molding resin 513 which is charged in the spaces 512 with the molded resin film 506 being formed around the entire bore suface 504 of the armature 501 and having the same shape as that of the spaces 512 formed by the armature windings 502, the upper mold 510 and the lower mold 511. When the elastic resin plates 514, 515 are then removed, as well as the molds being removed, the armature 501 can be obtained.

In the armature of this embodiment, since the bore surface of the armature is formed by the upper and lower molds so that the bore surface is outwardly inclined from substantially the central portion to both ends of the armature windings by the draft of each of the molds, the space between a rotor and a stator formed by the draft can be reduced as compared with conventional armatures, and the quality of the armature can be improved. In addition, since the both ends of the armature windings are respectively held by the upper and lower molds during the injection of the molding resin, only small portions at the both ends are exposed from the molding resin and other portions are not exposed therefrom, resulting in no loss of the function of the armature.

Although the above-described embodiment concerns the case in which the butting faces of the upper mold and the lower mold are substantially at the center of the armature, the abutting faces may be set in appropriate portions in the bore surface of the armature.

Figure 23:
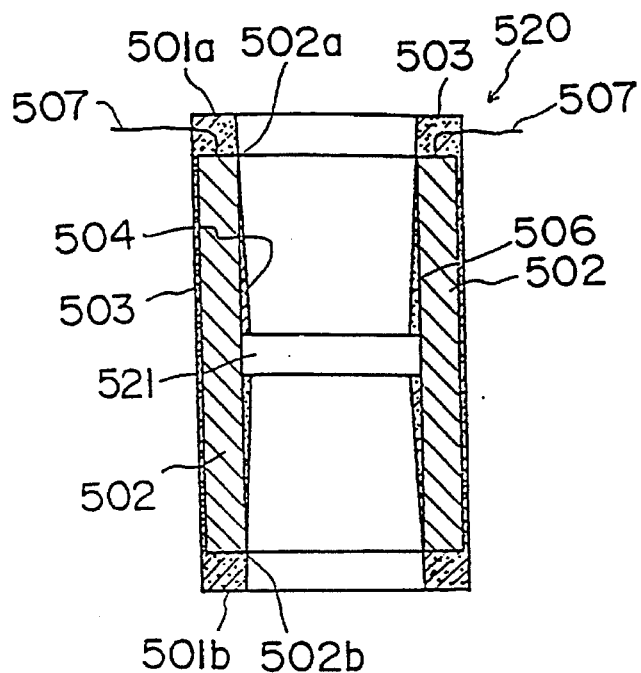
Figure 24:
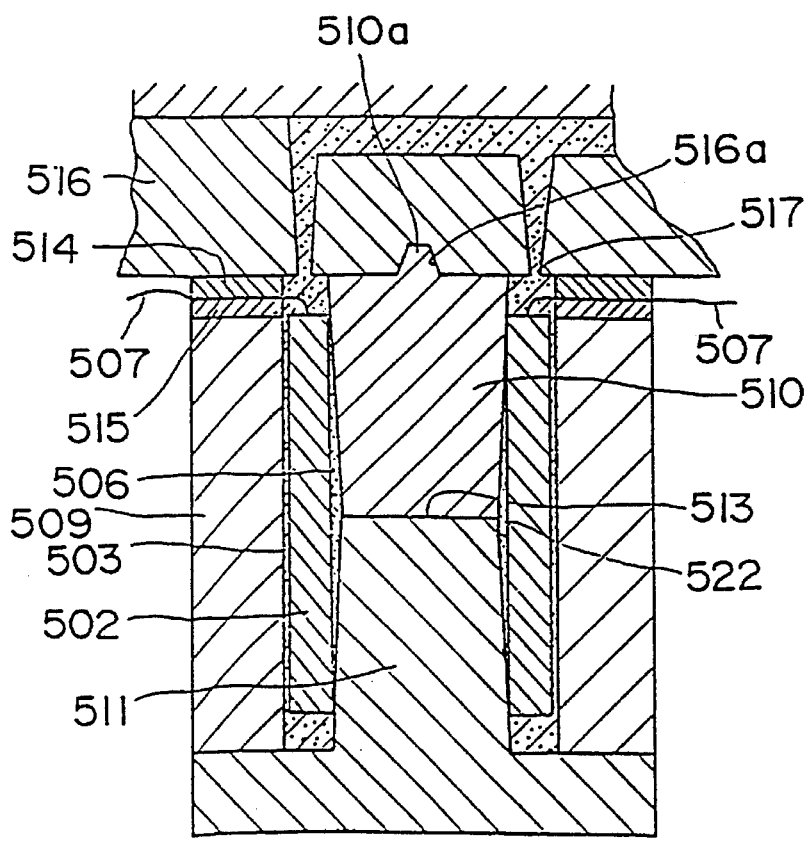

FIG. 23 is a sectional view of a still further embodiment of an armature for a revolving electric machine to which the present invention relates.

An armature 520 of this embodiment has a groove 521 which is provided around the periphery of the bore surface 504 thereof and a resin film 506 which is provided at an angle with starting from the groove 521 in the same way as the above-described embodiment. Since other members are the same as those of the above-described embodiment, they are denoted by the same reference numerals and are not described below.

The molding of the armature 520 can be performed by using the same molds as those used in the above-described embodiment. The armature 520 can also be obtained by previously providing a tape or a member 522 comprising an elastic ring having heat resistance (for example, polyimide) on a butting face 513a between an upper mold 510 and a lower mold 511, injecting molding resin to bury armature winding 502 in the resin by molding, and removing the member 522.

Since the armature of this embodiment has the bore surface which is outwardly inclined substantially from the center of the armature toward both ends thereof, the armature can exhibit the same Function and effect as those exhibited by the above-described embodiment. In addition, since the elastic member having heat resistance is provided, the armature windings can be prevented from being deformed and pushed on the upper mold or the lower mold during molding even if the filling pressure of the molding resin is high, thereby the resin film 503 can be precisely formed on the bore surface of the armature. When the armatureis assembled as a revolving electric machine, therefore, the armature windings are not deformed by vibration and heat generatd during operation and thus do not impair the fuction of the electric device. Since the elastic member is provided on the butting surface between the upper mold and the lower mold, no burr occurs in the butting portion, resulting in the possibility of precisely combining with a stator or the like.

What is claimed is:

1. A mold capable of forming a coreless armature having a plurality of windings, comprising:

a lower mold having a mold cavity therein, said mold cavity having an opening at an upper surface of said lower mold;

a shaft adapted for supporting a plurality of windings of a coreless armature, said shaft receivable in the mold cavity of said lower mold; an upper mold for depositing molding material into the mold cavity of said lower mold; and an elastic ring plate being positioned about the opening of said lower mold and adapted for contacting terminal ends of the windings extending outside of the mold cavity, said elastic ring plate further adapted to seal said mold cavity with the terminal ends extending therefrom.

2. The mold of claim 1, wherein said lower mold includes slits in its upper surface for receiving terminal ends of the windings, and said elastic ring plate adapted to seal about the terminal ends received in the slits.

3. The mold of claim 1, wherein said elastic ring plate comprises two adjacent concentric rings, said adjacent rings adapted for receiving between their adjacent surfaces the terminal ends of the windings.

4. The mold of claim 3 wherein the internal diameter of the elastic ring plate being smaller than the diameter of the opening of the mold cavity in said lower mold.

5. The mold of claim 1, wherein said elastic ring plate being positioned on the upper surface of said lower mold, and said elastic ring plate being adapted to receive at its upper surface the terminal ends of the windings.

6. The mold of claim 1, wherein said shaft being positioned in said mold cavity and having an upper surface at the opening of the lower mold, and said upper surface of said shaft being coplanar with the upper surface of said lower mold.

7. The mold of claim 1, wherein said shaft having an upper surface, and a thin film member being positioned on the upper surface of said shaft to prevent damage to said shaft when said shaft being in compressional relationships with said upper mold.

8. The mold of claim 1, wherein said elastic ring plate is affixed to the upper mold.

9. The mold of claim 1 wherein said lower mold includes a plurality of mold pieces, said mold pieces having registering faces by which each said mold piece contacts another mold piece.

10. A mold capable of forming a coreless armature having a plurality of windings, comprising:

a lower mold having a mold cavity therein, said mold cavity having an opening at an upper surface of said lower mold;

a shaft adapted for supporting a plurality of windings of a coreless armature, said shaft receivable in the mold cavity of said lower mold;

an upper mold for depositing molding material into the mold cavity of said lower mold; and an elastic ring plate being positioned about the opening of said lower mold and opposite said upper mold, and adapted for being compressed between said lower and upper molds, said elastic ring plate further adapted to contact and cooperate in positioning terminal ends of the windings as they extend outside of the mold cavity, and to seal during molding the mold cavity with the terminal ends extending therefrom.

11. A mold capable of forming a coreless armature having a plurality of windings, comprising:

a lower mold having a plurality of mold pieces, said mold pieces having registering forces by which each said mold piece contacts another mold piece, said lower mold with said contacting mold pieces defining a mold cavity therein which is open at an upper surface of said lower mold;

a shaft adapted for supporting a plurality of windings of a coreless armature, said shaft receivable in the mold cavity of said lower mold;

an upper mold for depositing molding material into the mold cavity of said lower mold; and an elastic ring plate disposed about the opening of said lower mold and opposite said upper mold, and adapted for being compressed between said lower mold and said upper mold during molding, said elastic ring plate further adapted for contacting terminal ends of the windings as they extend outside of said mold cavity, and for sealing said mold cavity so that there is no leakage of molding material from the terminal ends as they extend outside of the mold cavity.

* * * * *